(12) United States Patent
Williams et al.

(10) Patent No.: US 10,120,127 B1
(45) Date of Patent: Nov. 6, 2018

(54) MULTI-ELEMENT OPTICAL LINKS

(71) Applicant: THE UNITED STATES OF AMERICA, AS REPRESENTED BY THE SECRETARY OF THE NAVY, Washington, DC (US)

(72) Inventors: Keith J. Williams, Dunkirk, MD (US); Jason D. McKinney, Bowie, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/722,021

(22) Filed: Oct. 2, 2017

(51) Int. Cl.
*G02B 6/12* (2006.01)
*G02B 6/42* (2006.01)
*G02B 6/02* (2006.01)
*G02B 6/293* (2006.01)

(52) U.S. Cl.
CPC ....... *G02B 6/12019* (2013.01); *G02B 6/0208* (2013.01); *G02B 6/12004* (2013.01); *G02B 6/2938* (2013.01); *G02B 6/29323* (2013.01); *G02B 6/29361* (2013.01); *G02B 6/4203* (2013.01)

(58) Field of Classification Search
None
See application file for complete search history.

(56) References Cited

U.S. PATENT DOCUMENTS

| 8,059,969 | B1* | 11/2011 | Yap | H04B 10/25759 398/140 |
| 8,180,183 | B1* | 5/2012 | Yap | H01Q 13/00 343/772 |
| 8,750,709 | B1* | 6/2014 | Schaffner | H04B 10/90 398/115 |
| 9,882,654 | B1* | 1/2018 | Yap | H04B 10/697 |

OTHER PUBLICATIONS

Cox, Charles H. et al., Limits on the Performance of RF-Over-Fiber Links and Their Impact on Device Design, IEEE Transactions on Microwave Theory and Techniques, Feb. 2006, pp. 906-920, vol. 54, No. 2, IEEE Microwave Theory and Techniques Society, New York City, USA.

Cox, Charles H, et al., Broadband, Directly Modulated Analog Fiber Link with Positive Intrinsic Gain and Reduced Noise Figure, Proc. IEEE International Topical Meeting on Microwave Photonics, Oct. 12-14, 1998, pp. 157-160, IEEE Microwave Theory and Techniques Society, New York City, USA.

\* cited by examiner

*Primary Examiner* — Sung H Pak
(74) *Attorney, Agent, or Firm* — US Naval Research Laboratory; Suresh Koshy

(57) ABSTRACT

An apparatus includes an input radio frequency waveguide. The apparatus includes a radio-frequency-to-optical-radio-frequency-impedance-matching interface communicating with the input radio frequency waveguide. The apparatus includes a plurality of optical modulators communicating with the radio-frequency-to-optical-radio-frequency-impedance-matching interface. The apparatus includes a plurality of respective optical waveguides communicating with the (Continued)

plurality of optical modulators. The plurality of respective optical waveguides in operation includes a plurality of respective optical waveguide fields. The input radio frequency waveguide in operation includes an input radio frequency waveguide field. The input radio frequency waveguide field interacts with the plurality of respective optical waveguide fields to convert an input radio frequency signal into a plurality of optical signals.

13 Claims, 20 Drawing Sheets

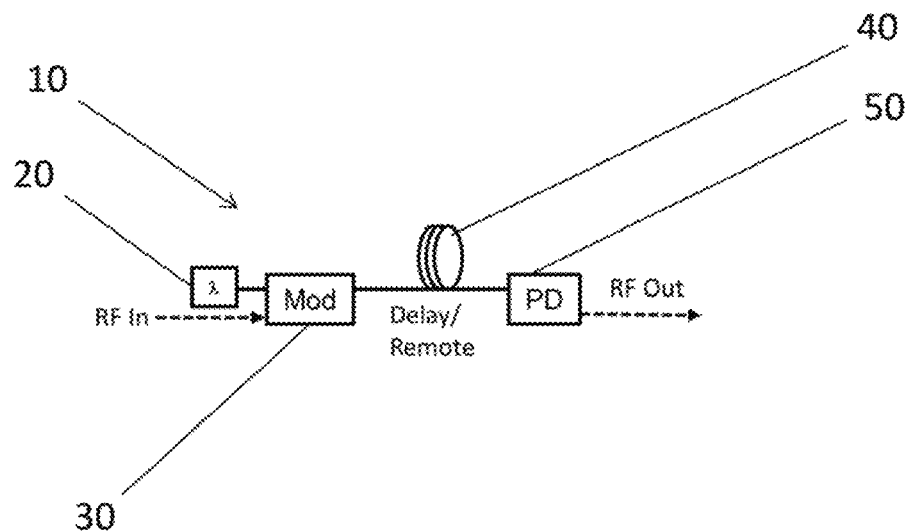
FIG. 1 – PRIOR ART

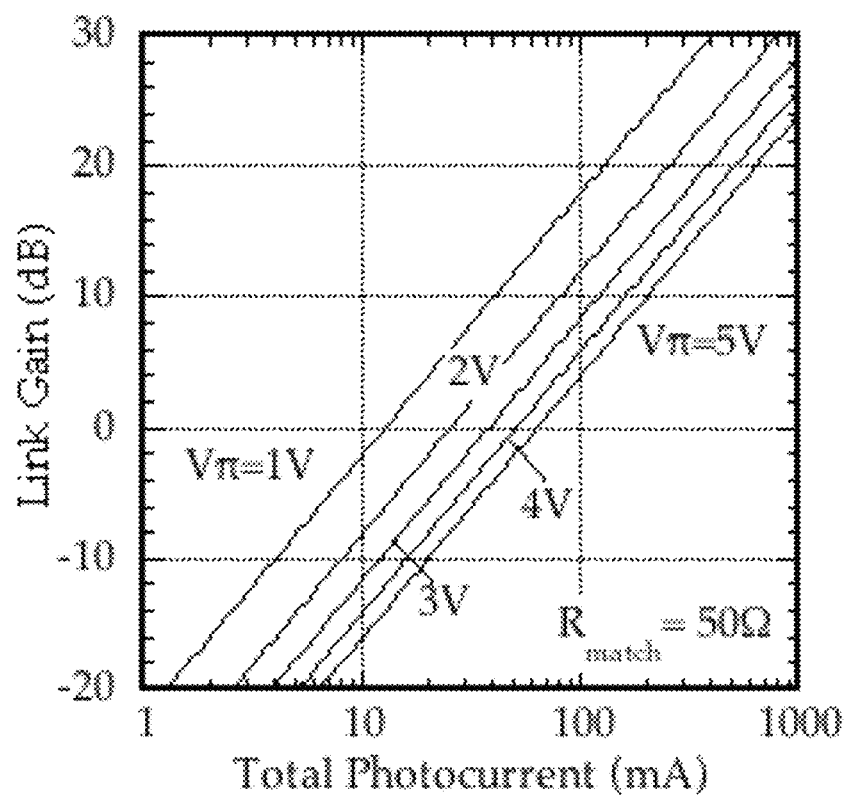
FIG. 2 – PRIOR ART

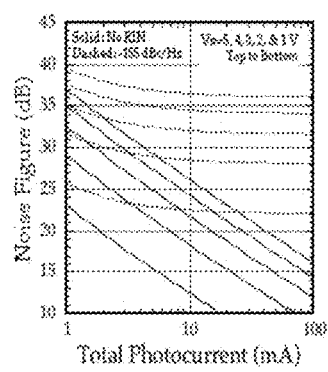
FIG. 3A – PRIOR ART
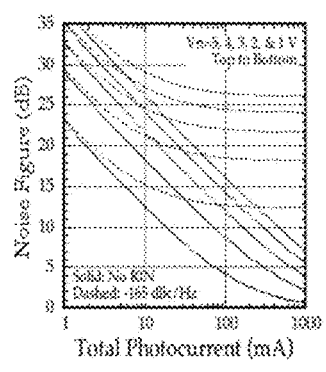
FIG. 3B – PRIOR ART
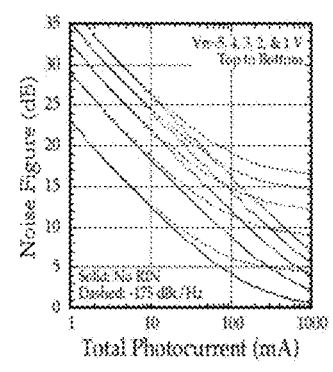
FIG. 3C – PRIOR ART

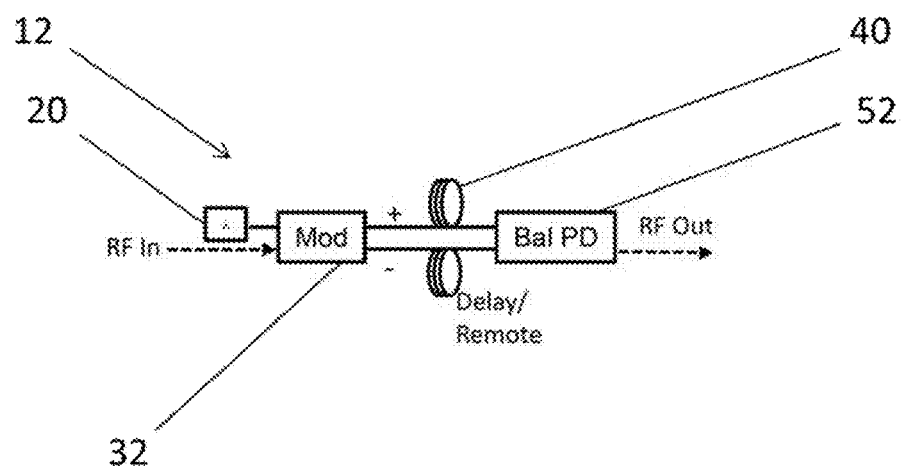
FIG. 4 – PRIOR ART

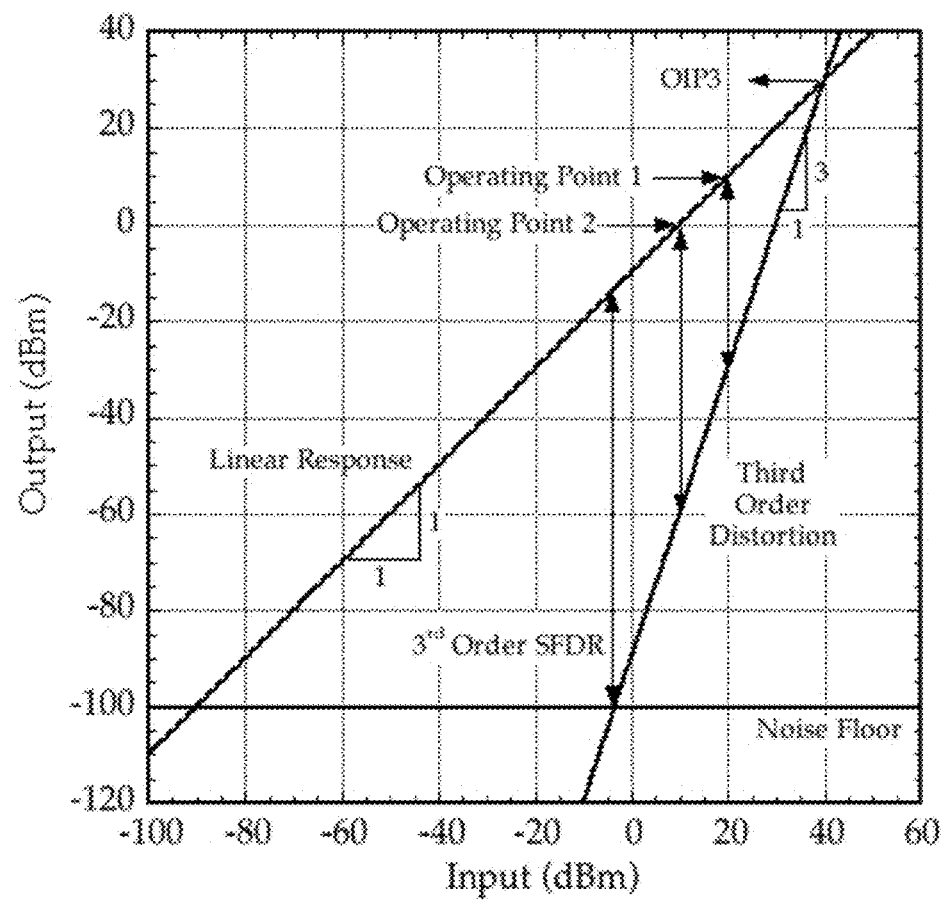
FIG. 5 — PRIOR ART

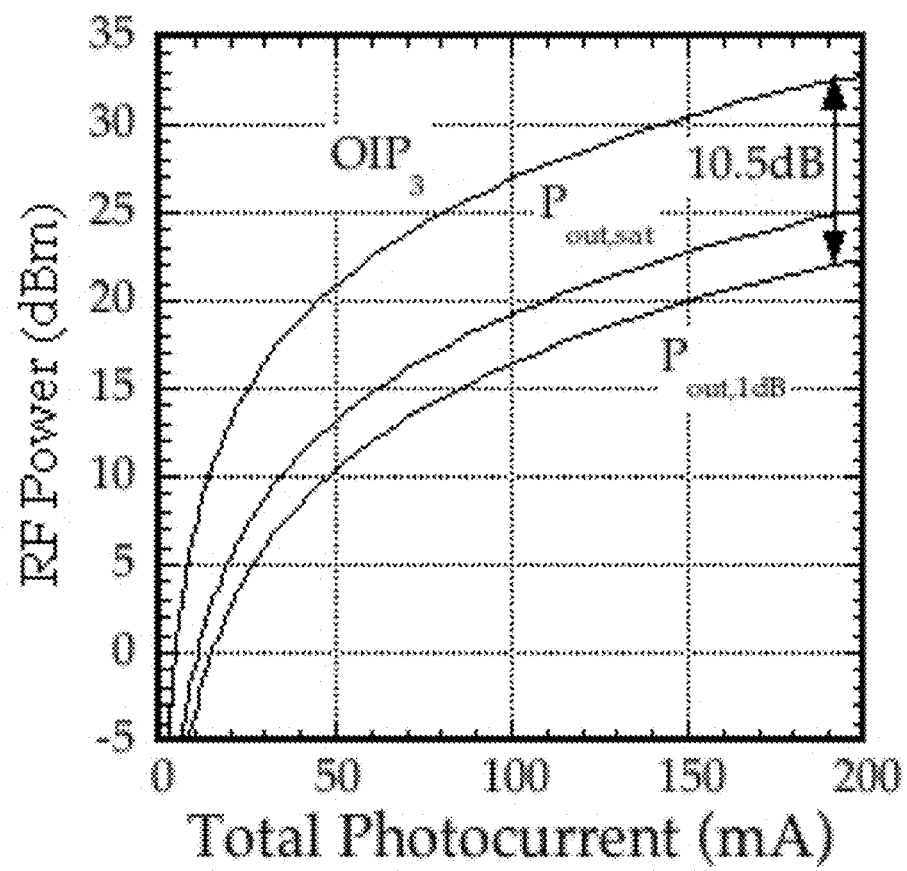
FIG. 6 – PRIOR ART

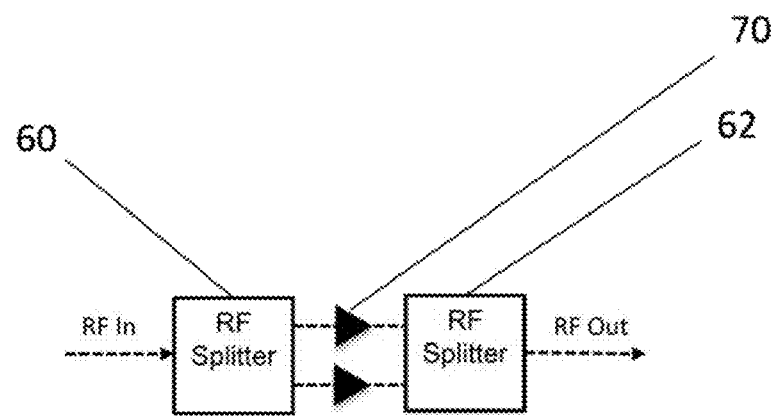
FIG. 7 – PRIOR ART

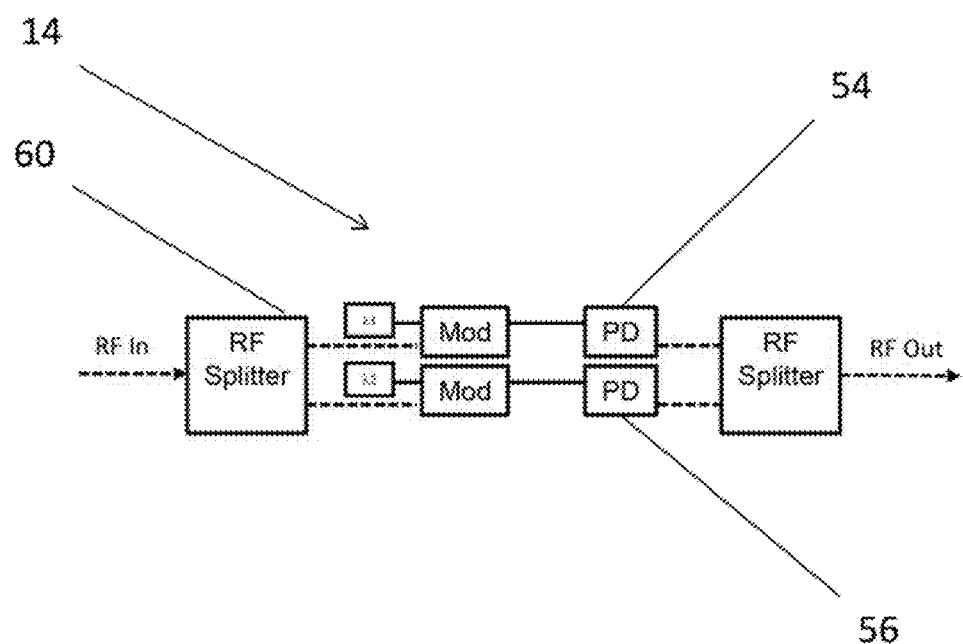
FIG. 8 – PRIOR ART

MULTI-ELEMENT OPTICAL LINKS

FIELD OF THE INVENTION

The present invention relates in general to photonic links, and in particular to integrated photonic links.

BACKGROUND OF THE INVENTION

Digital communication systems are steadily being replaced by optical systems to move information around more efficiently and with significantly higher bandwidths. As bit rates increase, the communication distances where optical solutions outperform their electronic counterparts is quickly approaching distances of up to a few meters. The use of optical integration has accelerated this movement to photonics both in the Indium Phosphide and Silicon integration platforms.

Separately, public sector systems and private sector systems are quickly expanding in bandwidth as the use of the electromagnetic spectrum expands from the traditional frequency bands below 18 GHz to frequencies up to and exceeding 110 GHz. The rapid advancement of electronic integrated circuits has enabled even an unsophisticated competitor the ability to design highly effective systems that can operate outside of these traditional frequency bands. Analog photonics in the form of fiber optics and discrete components have shown much promise in dealing with this bandwidth problem. However, the analog performance of even fiber optic solutions for these problems are just now beginning to have the necessary radio frequency ("RF") performance to meet some public sector systems' needs and/or private sector systems' needs. Photonic Integrated Circuits ("PICS") with circuit densities over 100 optical elements are emerging quickly to replace optical subsystems in optical communication systems that have traditionally been served by individual bulk fiber optic components technology. Much like the revolution in electronics integration, photonics integration will only continue to evolve and expand in complexity and capability. However, the performance of PICS for use in analog RF photonic systems is too poor for PICs to make any significant inroads into analog applications. The performance of analog fiber optic versions of these systems fabricated using PICs is even further behind that of versions based on discrete fiber-based optical components. This is rooted in the lower performance available from the individual integrated devices that make up an optical link.

FIG. 1 shows a block diagram of a prior art, externally-modulated fiber optic link 10, the building block of many analog RF systems that utilize fiber optics. The link 10 consists of a continuous wave ("CW") laser source 20 (with a wavelength $\lambda$) that is intensity modulated by an external modulator ("Mod") 30 with an input RF signal, transported over an optical fiber 40 to a photodetector, e.g., output photodiode ("PD") 50, where the optical signal is converted back to an RF signal. The RF gain of the link 10 in FIG. 1 is determined by only two parameters: 1) the efficiency of the external modulator, $V\pi$, denoted by the voltage required to induce a $\pi$-phase shift of the light in the external modulator 30, and 2) the photocurrent at the output which is a function of the power in the CW laser 20, the optical losses, and the quantum efficiency of the output photodetector 50. The gain of this link 10 is plotted in FIG. 2 as a function of the total received photocurrent for several modulator efficiencies ($V\pi$), wherein the output photodiode 50 contains a 50 Ohm parallel resistor to achieve a good RF output impedance match. As can be seen in the plot, the trend to achieving gain is to both decrease the modulator $V\pi$ and increase the detected photocurrent. In fiber optic versions of this link, link gains greater than unity (0 dB) are readily achieved at microwave frequencies.

The noise figure of the link in FIG. 1 is usually the most important metric that is considered in link design. Noise degrades signal fidelity and degrades the ability to process the signals further. The noise figure of the link in FIG. 1 is plotted versus photocurrent for several modulator efficiencies ($V\pi$) in FIGS. 3A-3C. The three plots in FIGS. 3A-3C from left to right include plots of the shot-noise limited performance (RIN=0, solid curves) and plots including laser RIN of −155, −165 and −175 dBc/Hz, respectively (dashed curves), wherein RIN is the relative intensity noise of the laser 20. For similar reasons as link gain, the noise figure generally decreases as the modulator $V\pi$ decreases and as the detected photocurrent increases. However, when RIN is included, eventually the noise figure approaches a minimum, the value of which increases with higher levels of RIN.

The difference between the solid and dashed curves in FIGS. 3A-3C at a fixed modulator $V\pi$ is the degradation in noise figure performance due to the added laser RIN. The degradation is reasonably independent of modulator $V\pi$, as RIN manifests itself as added noise in the output RF signal, independent of modulator efficiency until the link achieves a very low noise figure. Typical semiconductor lasers achieve RIN values in the −155 to −165 dBc/Hz range or worse, depending on frequency. Laser RIN is therefore an important factor to consider in achieving low noise figures.

One solution to mitigate the effects of laser RIN is to cancel it in the output of a balanced link. FIG. 4 shows an example of this type of prior art link 12. A dual-output (complementary) modulator 32 is utilized that provides outputs that are 180 degrees out of RF phase. Both signals are then propagated down two identical fibers 40 ("Delay/Remote") where the outputs are subtracted in a balanced pair of photodiodes 52 ("Bal PD"). Because the laser RIN is common-mode and the RF signal of interest is complementary, the subtraction process suppresses the effects of RIN by an amount determined by the amplitude and phase match of the two paths. It is typical for this type of prior art link 12 to achieve 20 to 30 dB of common-mode rejection. However, this requires two identical length fibers. Obtaining identical length fibers is difficult to implement for long delays and at higher frequencies, wherein environmental drifts cause dynamic phase mismatches, especially due to thermal mismatches in the two propagation paths, thus limiting the level of common-mode rejection.

After the noise figure, the second important metric for an RF link is the spurious response characterized by the spur-free dynamic range. For any real system, as the input signal level increases, the output eventually compresses. This compression results in nonlinearity or spurious signals in the output. For narrow bandwidth systems, the third-order intermodulation distortion products are usually the most important, as they remain in-band with the original signals of interest and cannot be filtered out. A typical transfer diagram to show this is plotted in FIG. 5. The linear response of a system is extrapolated with a straight line (i.e., a linear response) having slope of 1. The third-order distortion is fit to a straight line having a slope of 3, as the power in these distortion products is proportional to the cube of the fundamental power. The intersection of these two straight lines is the intercept point. When referenced to the output power, this intercept point is the output third-order intercept ("OIP3"). If the noise floor is included as in FIG. 5, the third-order, spurious-free dynamic range ("SFDR") is defined as the range of input powers for which the third-order distortion remains below the noise floor. The SFDR is uniquely determined by the noise floor (which in turn is determined by noise figure) and the OIP3 of the link.

The OIP3 of a Mach-Zehnder modulated link is plotted in FIG. 6 along with the 1-dB compression point and the saturated output power. In this plot, the distortion introduced by the 50 Ohm impedance-matched photodetector is assumed negligible. The OIP3 of this type of link is only a function of photocurrent; therefore, the link SFDR is increased by increasing photocurrent, so long as the noise floor remains low, which implies a low noise figure. In a similar fashion to noise figure, if the laser RIN is high, the SFDR saturates and no longer increases as photocurrent increases as the OIP3 and the noise floor increase photocurrent together, capping SFDR.

To increase the OIP3 beyond that predicted by FIG. 6, linearization techniques must be employed to either mitigate or improve the distortion characteristics of the modulator, or to limit the input signal level. Improvements using these approaches have been done in the prior art. One such approach is to limit the input signal level with an array of elements as shown in FIG. 7 for amplifiers. By splitting the input signal level into many lower power copies using RF splitters 60, 62 (two being shown in FIG. 7 for ease of understanding), the input signal level is reduced at the input to each identical amplifier 70. This lowers the operating point of the amplifier 70. This is shown graphically by the two operating points in FIG. 5. By lowering the input power from operating point 1 to operating point 2 (in this example, n=10 resulting in a 10 dB lower input power), the third-order distortion reduced by an amount that is three times smaller than the linear response (30 dB in this example) owing to the third-order distortion having a slope of 3. After amplification, the signals are then summed coherently (amplitude and phase-matched) in a second RF splitter (used as a combiner). Because both the signal and distortion products add linearly in the second RF splitter, the net result is that the distortion at the RF output is lower (20 dB in this example), and the gain of the entire system is equal to the gain of a single amplifier. Therefore, a configuration like that shown in FIG. 7 is trading off the use of n identical amplifiers to yield a system with the same gain as a single amplifier, but with an OIP3 that increases by an amount equal to 10*log(n)(10 dB in this example) because the OIP3 increase is equal to 50% of the net reduction in the distortion for systems with equivalent gain.

Arraying optical links can also be used to increase their performance metrics. Arrayed photodetectors increase link gain. A single modulator can be split into many photodetectors, and depending on the recombination method, can result in higher link gain. An arrayed optical link, for example, includes an RF splitter and multiple photodetectors hard-wired together. Another optical link, for example, includes a WDM. If a prior art optical link 14 is used as shown in FIG. 8, instead of an amplifier 70 of FIG. 7, the link linearity can be improved at the expense of more parallel channels. This is impractical, but technically feasible, with fiber-based components owing to the added cost and complexity of utilizing multiple links. The gain of the apparatus in FIG. 8 is degraded due to the initial RF splitter 60, when RF recombination is considered. If hard-wired photodetectors 54, 56 are used (e.g., output photodetector leads being connected together), the gain is improved by 10*log(n), albeit at the expense of lowering the bandwidth of the photodetectors due to the parallel nature of the photodetector capacitances summing to yield a lower RC-limited bandwidth. Arrayed photodetectors also have been used to improve link linearity, when photodetector distortion is the limiting factor.

BRIEF SUMMARY OF THE INVENTION

An embodiment of the invention includes an apparatus including an input radio frequency waveguide. The apparatus includes a radio-frequency-to-optical-radio-frequency-impedance-matching interface communicating with the input radio frequency waveguide. The apparatus includes a plurality of optical modulators communicating with the radio-frequency-to-optical-radio-frequency-impedance-matching interface. The apparatus includes a plurality of respective optical waveguides communicating with the plurality of optical modulators. The plurality of respective optical waveguides in operation includes a plurality of respective optical waveguide fields. The input radio frequency waveguide in operation includes an input radio frequency waveguide field. The input radio frequency waveguide field interacts with the plurality of respective optical waveguide fields to convert an input radio frequency signal into a plurality of optical signals.

Another embodiment of the invention includes an apparatus including a plurality of optical modulators. The apparatus includes a plurality of respective optical waveguides communicating with the plurality of optical modulators, The plurality of respective optical waveguides in operation includes a plurality of respective optical waveguide fields. The apparatus includes an incoherent optical signal combiner communicating with the plurality of respective optical waveguides. The apparatus includes a phase-balanced photodetector or a phase-balanced photodetector array communicating with the incoherent optical signal combiner. The apparatus includes an output radio frequency waveguide communicating with the phase-balanced photodetector or the phase-balanced photodetector array and outputs an output radio frequency signal. The output radio frequency waveguide in operation includes an output radio frequency waveguide field. The plurality of respective optical waveguide fields interacts with the output radio frequency waveguide field to convert a plurality of optical signals into the output radio frequency Another embodiment of the invention includes an apparatus. The apparatus includes a balanced link including a first optical wavelength division multiplexer. The balanced link includes an optical signal processor communicating with the first optical wavelength division multiplexer. The balanced link includes a second optical wavelength division multiplexer communicating with the optical signal processor. The first second optical wavelength division multiplexer includes a first interleaver, a first arrayed waveguide grating, a first thin film filter, a first Fabry-Perot filter, and/or a first fiber Bragg grating. The optical signal processor includes a time delay, a switch, an amplitude control, and/or a frequency control. The second optical wavelength division multiplexer includes a second interleaver, a second arrayed waveguide grating, a second thin film filter, a second Fabry-Perot filter, and/or a second fiber Bragg grating.

An embodiment of the invention solves the problem of performance of PICs for use in analog RF photonic systems being too poor for them to be widely used in analog applications by using novel optical devices and architectures, thereby allowing many lower quality integrated optical components to work together to achieve the high aggregate RF performance necessary to be useful for emerging analog RF applications. An embodiment of this invention provides key solutions that will enable a new class of subminiature RF subsystems based on photonic integrated circuits and be useful in certain analog systems that utilize fiber-based discrete devices. An embodiment of this invention is equally applicable to technology solutions based on the Silicon (Si), Indium Phosphide (InP), Gallium Arsenide (GaAs), and Lithium Niobate (LiNbO3) integration platforms as well as other standard, integrated photonics platforms.

An embodiment of the invention is analogous to the revolutionary leap from discrete electronic components to integrated electronic circuits. Advantageously, an embodiment of the invention utilizes many lower-quality integrated components together to perform the function of single higher performance component. Integrated photonic links according to an embodiment of the invention are likely to be significantly cheaper. For example, whereas a single high-end discrete optical link may cost $20,000, an integrated photonic link according to an embodiment of the invention is likely to cost on the order of $1,000.

Additionally, integrated photonic links according to one or more embodiments of the invention are likely to be significantly smaller. For example, an integrated photonic link according to one or more embodiments of the invention is likely to be around three orders of magnitude smaller than a single high-end discrete optical link. Additionally, as the state of the art in discrete photonic components improves in cost and performance, integrated photonic links according to the instant invention provide that much more value.

An embodiment of the invention is used in aircraft with myriad sensors linked by discrete photonic components. For example, an embodiment of the invention includes monitoring systems for law enforcement.

Another embodiment of the invention includes fiber-optic antenna remoting in high-frequency sensor systems and communications networks. For example, an embodiment of the invention includes higher bandwidth RF communication networks, e.g., 5G networks and beyond. Yet another embodiment of the invention includes terrestrial RF communications networks, e.g., for high frequency trading.

Another embodiment of the invention described herein provides a unique and novel improvement to the efficiency of integrated optical links for analog applications that make use of many lower-quality links to work together to yield a substantially higher performance link.

Another embodiment of the invention provides for a way to reduce the noise figure, increase the gain and dynamic range in optical links for RF, signal processing and communications systems.

Another embodiment of the invention provides solutions to enable balanced detection links that utilize a single transmission fiber, thus reducing the sensitivity to environmental perturbations and improving linearity.

Another embodiment of the invention provides for a way to produce a net gain optical link with a reduced noise figure for RF communications.

Another embodiment of the invention includes the use of a large number of wavelengths/modulators in a long single-mode fiber remoting application to improve the performance compared to single wavelength links due to a reduction in fiber nonlinearity impairments due to the lower power per wavelength.

Another embodiment of the invention includes an optical amplifier in the propagation fiber to yield improve noise performance as the added noise across wavelength channels is not coherent with the RF signal and may be suppressed relative to the coherent signal gain in the detection process.

BRIEF DESCRIPTION OF THE DRAWINGS

FIG. 1 is a block diagram of a prior art, externally modulated optical link.

FIG. 2 is a plot of link gain as a function of photocurrent for a prior art, externally modulated optical link.

FIG. 3A is a plot for a prior art externally modulated optical link of a laser RIN level of −155 dBc/Hz as compared to an equivalent optical link without RIN.

FIG. 3B is a plot for a prior art externally modulated optical link of a laser RIN level of −165 dBc/Hz as compared to an equivalent optical link without RIN.

FIG. 3C is a plot for a prior art externally modulated optical link of a laser RIN level of −175 dBc/Hz for a prior art externally modulated optical link as compared to an equivalent optical link without RIN.

FIG. 4 is a block diagram of another prior art, externally modulated optical link.

FIG. 5 is a plot of transfer characteristics of a RF component for the prior art externally modulated optical link of FIG. 4, the transfer characteristics including a linear response, a third order distortion response and an output noise floor.

FIG. 6 is a plot of the output third order intercept ("OIP3") of a prior art Mach-Zehnder modulated link along with the 1-dB compression point and the saturated output power.

FIG. 7 is a block diagram of a prior art, RF circuit that utilizes amplifier channels to improve the RF characteristics of the total circuit compared to the individual amplifiers.

FIG. 8 is a block diagram of another prior art, RF circuit that utilizes optical link channels to improve the RF characteristics of the total circuit compared to the individual optical links.

DETAILED DESCRIPTION OF THE INVENTION

Concerning integrated photonic links, Inventors sought to combine many parallel optical links in unique ways to improve the overall performance of an RF subsystem. They realized that keeping the impedance-matched RF splitters would only yield improved linearity over a single link as well as a few other RF metrics in a similar fashion to the prior art, all-RF approaches as shown in FIGS. 7 and 8. Inventors recognized that replacing these RF-splitters with an alternative was important because the RF metrics that do not improve with this style parallelism are noise figure and gain. Unfortunately, when the RF is impedance-matched through RF splitters and combiners as shown in FIGS. 7 and 8, Inventors realized that the RF noise figure and gain of the aggregate system are not improved beyond the noise figure and gain of the individual connections within the array of "identical" RF sub-elements, no matter how large the array size grows. For such apparatuses including an array of "identical" RF sub-elements, Inventors determined that the RF splitters and re-combiners must be matched to 50 Ohms for all port. Nevertheless, Inventors determined that if a different type of splitting and recombining were utilized, both noise figure and gain would be improved for such a link. Such a link would allow for the arrays of lower-performing links to work together to yield a high performance link, a powerful tool that could enable a new class of RF component technology capabilities.

Figure 10:
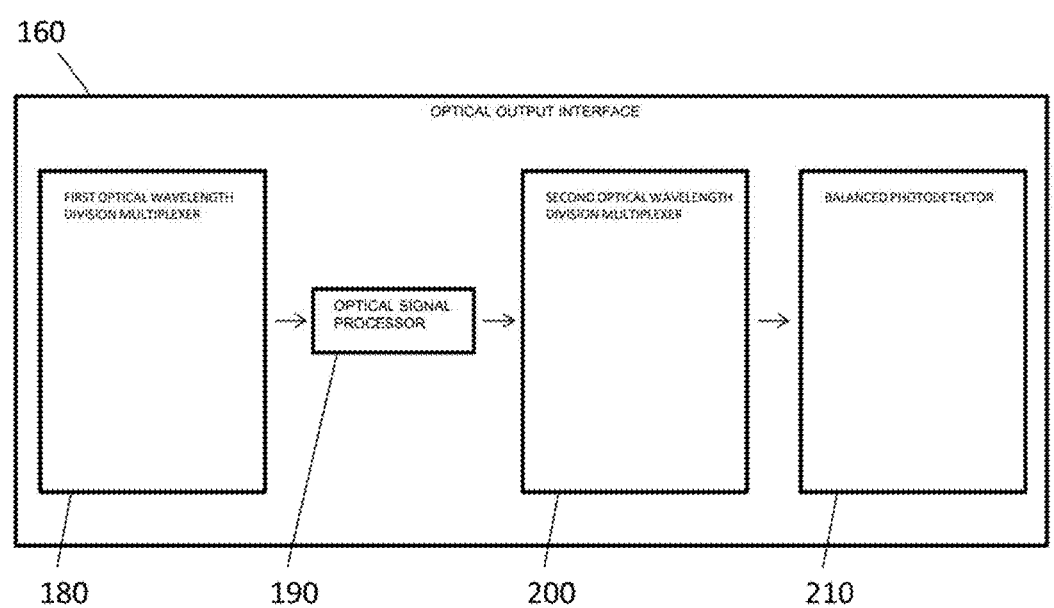
FIG. 10 is a block diagram of a balanced link according to an embodiment of the invention.
Figure 11:
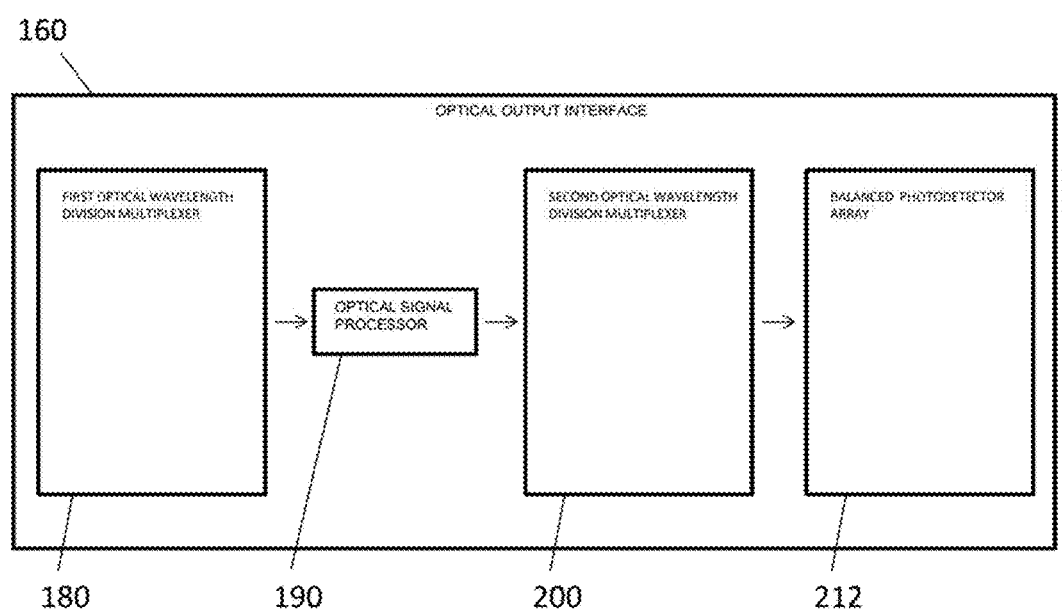
FIG. 11 is a block diagram of a balanced link according to an embodiment of the invention.

In view of the above, an embodiment of the invention includes an apparatus 110 and is described as follows with reference to FIGS. 9-11. As shown by way of illustration FIG. 9, the apparatus 110 includes a standard input radio frequency waveguide 120. The apparatus 110 includes a radio-frequency-to-optical-radio-frequency-impedance-matching interface 130 communicating with the input radio frequency waveguide 120. The apparatus 110 includes a plurality of standard optical modulators 140, 142 communicating with the radio-frequency-to-optical-radio-frequency-impedance-matching interface 130. Although N optical modulators are shown in FIG. 1, one of ordinary skill in the art will readily appreciate that the exact number of optical modulators will depend on application-specific factors imposed on the apparatus in practice. The apparatus 110 includes a plurality of standard, respective optical waveguides 150, 152 communicating with the plurality of optical modulators 140, 142. Although N optical waveguides are shown in FIG. 1, one of ordinary skill in the art will readily appreciate that the exact number of optical waveguides will depend on the number of optical modulators, and vice versa. The plurality of respective optical waveguides 150, 152 in operation includes a plurality of respective optical waveguide fields. The input radio frequency waveguide 120 in operation includes an input radio frequency waveguide field. The input radio frequency waveguide field interacts with the plurality of respective optical waveguide fields to convert an input radio frequency signal into a plurality of optical signals.

Optionally, each optical modulator of the plurality of optical modulators 140, 142 includes a standard optical intensity modulator, a standard optical phase modulator, a standard optical polarization modulator, or a standard optical frequency modulator.

Figure 9:
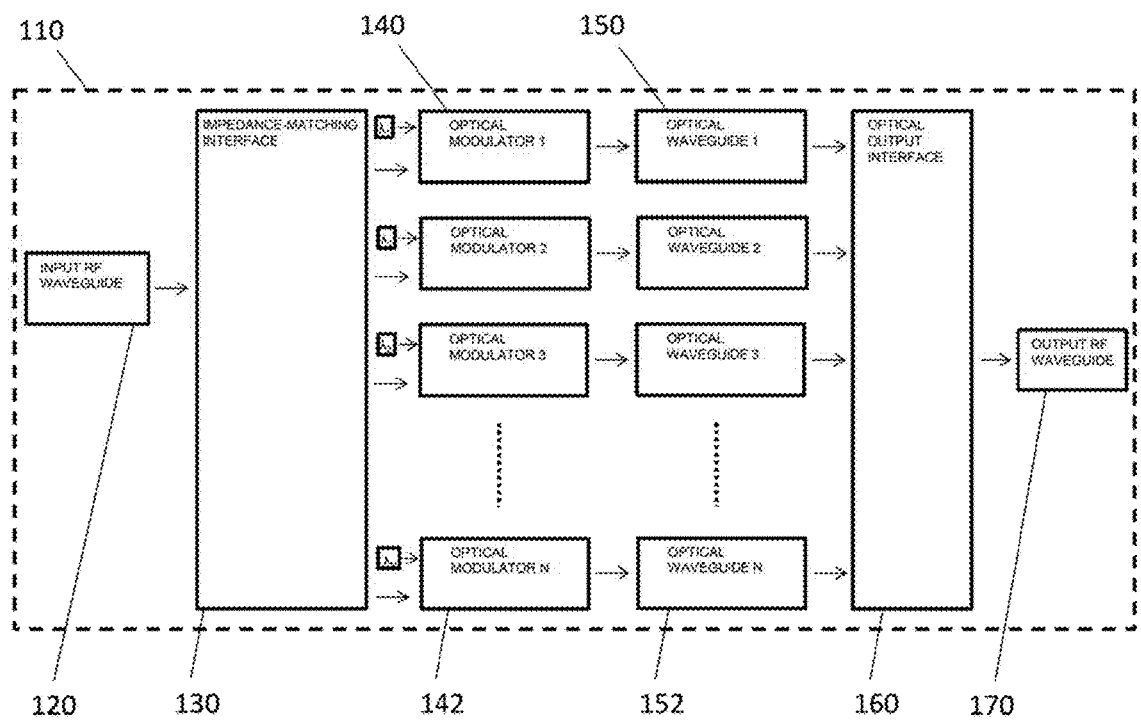
FIG. 9 is a block diagram of an embodiment of the invention including an impedance-matching interface and a balanced link.

Optionally, as shown by way of illustration in FIG. 9, the apparatus includes a standard optical output interface 160 communicating with the plurality of respective optical waveguides 150, 152, and an output radio frequency waveguide 170 communicating with the optical output interface 160. Optionally, as shown by way of illustration in FIGS. 10 and 11, the optical output interface 160 includes a standard, first optical wavelength division multiplexer 180. The first optical wavelength division multiplexer 180 includes a standard, first interleaver, a standard, first arrayed waveguide grating; a standard, first thin film filter; a standard, first Fabry-Perot filter; and/or a standard, first fiber Bragg grating. The optical output interface 160 farther includes an optical signal processor 190 communicating with the first optical wavelength division multiplexer 180. The optical signal processor 190 includes a standard time delay, a standard switch, a standard amplitude control, and/or a standard frequency control. The optical output interface 160 also includes a standard, second optical wavelength division multiplexer 200 communicating with the optical signal processor 190. The second optical wavelength division multiplexer 200 includes a standard, second interleaver, a standard, second arrayed waveguide grating; a standard, second thin film filter, a standard, second Fabry-Perot filter; and a standard, second fiber Bragg grating. The optical output interface 160 further includes a phase-balanced photodetector 210, as shown by way of illustration in FIG. 10, or a phase-balanced photodetector array 212, as shown by way of illustration in FIG. 11, communicating with the second optical wavelength division multiplexer 200 and the output radio frequency waveguide 170. The phase-balanced photodetector 210 or the phase-balanced photodetector array 212 outputs an output radio frequency signal to the output radio frequency waveguide 170.

Figure 12:
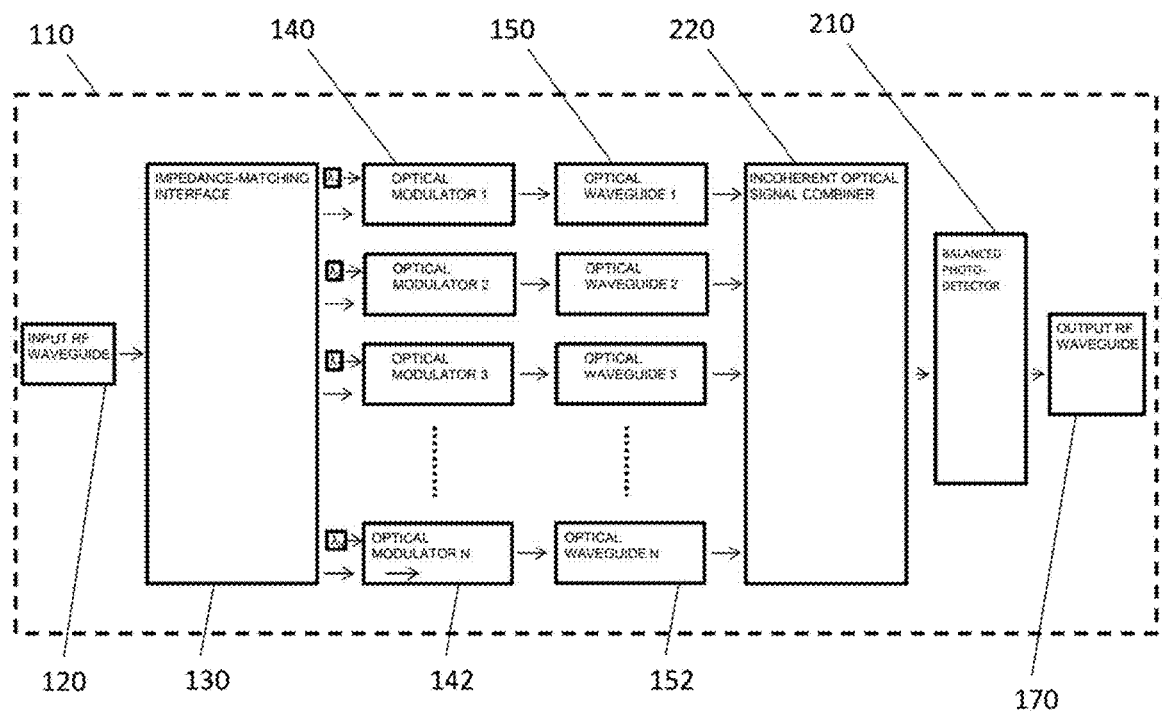
FIG. 12 is a block diagram of another embodiment of the invention including an impedance-matching interface and an incoherent optical signal combiner.
Figure 13:
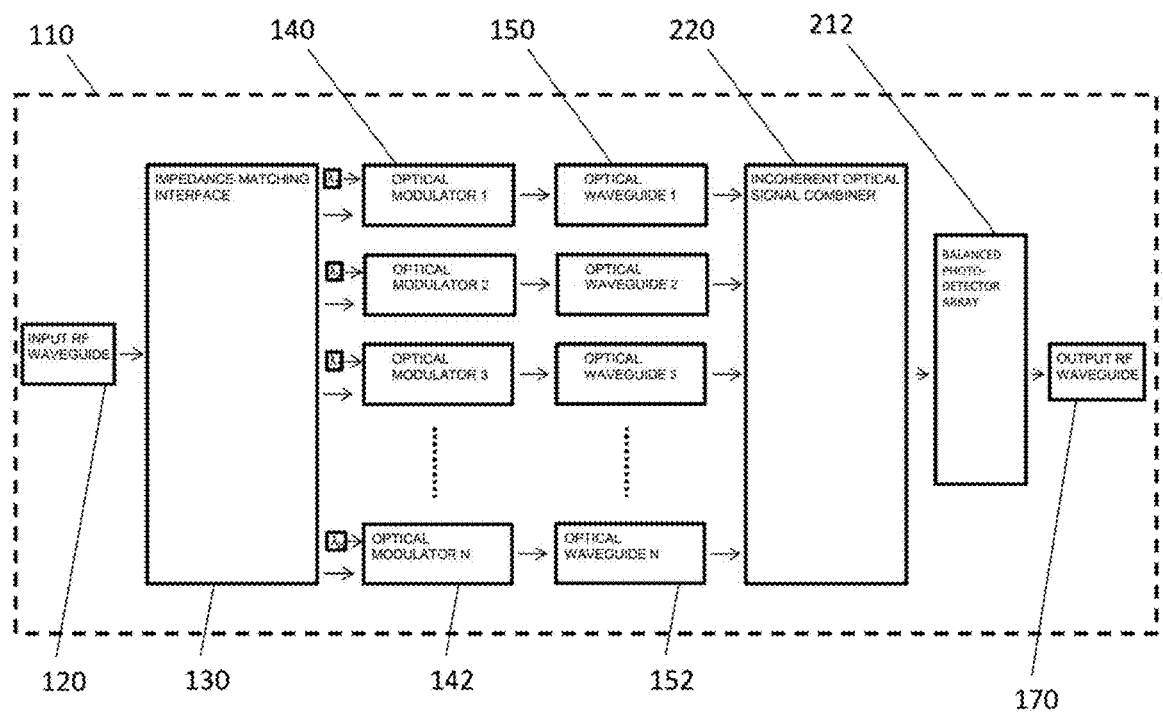
FIG. 13 is a block diagram of another embodiment of the invention including an impedance-matching interface and an incoherent optical signal combiner.
Figure 14:
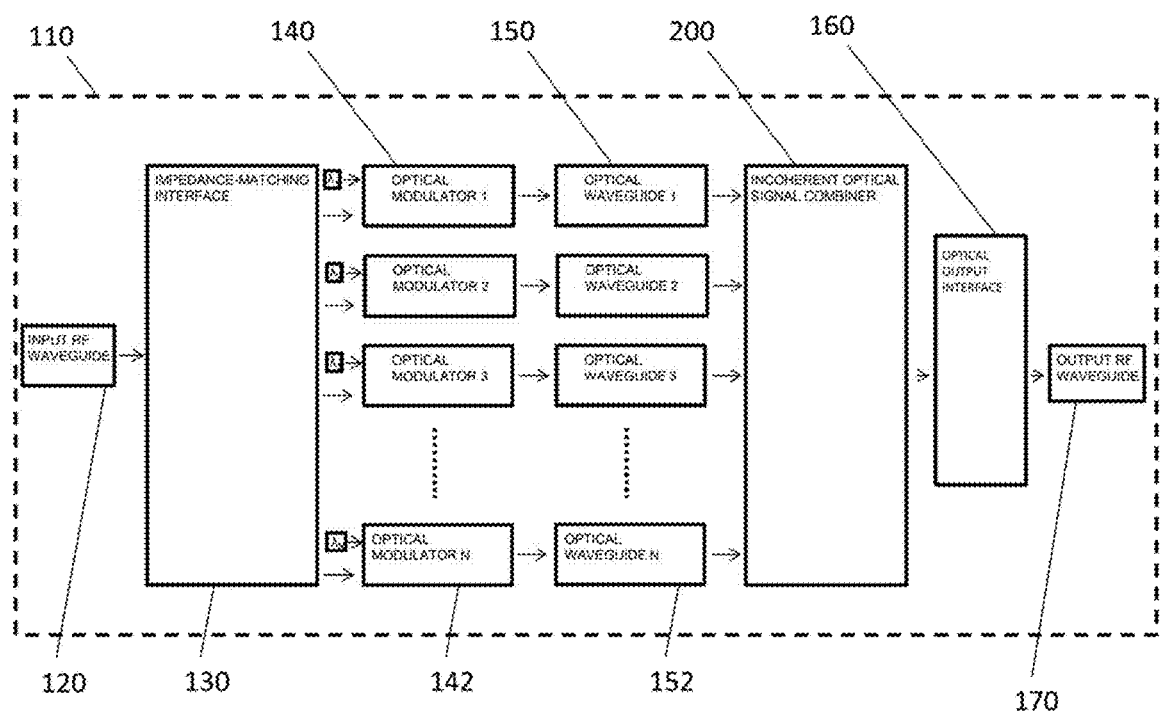
FIG. 14 is a block diagram of another embodiment of the invention including an impedance-matching interface, an incoherent optical signal combiner, and a balanced link.

Optionally, as shown by way of illustration in FIGS. 12-14, the apparatus 110 includes a standard, incoherent optical signal combiner or summer 220 communicating with the plurality of respective optical waveguides 150, 152. The apparatus further includes a standard phase-balanced photodetector 210 or a standard phase-balanced photodetector array 212 communicating with the incoherent optical signal combiner 220. The apparatus 110 also includes a standard output radio frequency waveguide 170 communicating with the phase-balanced photodetector 210 or the phase-balanced photodetector array 212. Optionally, the incoherent optical signal combiner 220 includes a standard wavelength division multiplexer, a standard spatial division multiplexer, or an optical modal summer.

Optionally, the apparatus 110 further includes a single standard microchip or a plurality of standard microchips including the impedance-matching interface 130 and/or the incoherent optical signal combiner 220.

Another embodiment of the invention includes an apparatus 110 and is described as follows with reference to FIGS. 12-16. The apparatus 110 includes a plurality of standard optical modulators 140, 142. The apparatus 110 includes a plurality of standard, respective optical waveguides 150, 152 communicating with the plurality of optical modulators 140, 142. The plurality of respective optical waveguides 150, 152 in operation includes a plurality of respective optical waveguide fields. The apparatus 110 includes a standard incoherent optical signal combiner 220 communicating with the plurality of respective optical waveguides 150, 152. The apparatus 110 includes a standard, phase-balanced photodetector 210, as shown by way of illustration in FIG. 12, or a standard, phase-balanced, photodetector array 212, as shown by way of illustration in FIG. 13, communicating with the incoherent optical signal combiner 220. The apparatus 110 includes an output radio frequency waveguide 170 communicating with the phase-balanced photodetector 210 or the phase-balanced photodetector array 212, and outputting an output radio frequency signal. The output radio frequency waveguide 170 in operation includes an output radio frequency waveguide field. The plurality of respective optical waveguide fields interacts with the output radio frequency waveguide field to convert a plurality of optical signals into the output radio frequency signal.

Optionally, the incoherent optical signal combiner 220 includes a standard wavelength division multiplexer, a standard spatial division multiplexer, or a standard optical modal summer.

Optionally, as shown by way of illustration in FIGS. 12 and 13, the apparatus 110 further includes a standard input radio frequency waveguide 120 and a standard radio-frequency-to-optical-radio-frequency-impedance-matching interface 130 communicating with the input radio frequency waveguide 120 and the plurality of optical modulators 140. The input radio frequency waveguide 120 in operation includes an input radio frequency waveguide field. The input radio frequency waveguide field interacts with the plurality of respective optical output waveguide fields to convert an input radio frequency signal into the plurality of optical signals. Optionally, the apparatus further includes a single, standard microchip or a plurality of standard microchips including the impedance-matching interface 230 and/or the incoherent optical signal combiner 220. Optionally, each optical modulator of the plurality of optical modulators 140, 142 includes a standard, optical intensity modulator; a standard optical phase modulator; a standard optical polarization modulator; or a standard optical frequency modulator.

Optionally, as shown by way of illustration in FIG. 14, the apparatus 110 further includes a standard optical output interface 160 communicating with the plurality of optical waveguides and said output radio frequency waveguide. Optionally, the optical output interface 160 includes a standard, first optical wavelength division multiplexer 180. The first optical wavelength division multiplexer 180 includes a standard, first interleaver; a standard, first arrayed waveguide grating; a standard, first thin film filter; a standard, first Fabry-Perot filter; and/or a standard, first fiber Bragg grating. The optical output interface 160 further includes a standard, optical signal processor 190 communicating with the first optical wavelength division multiplexer 180. The optical signal processor includes a standard time delay, a standard switch, a standard amplitude control, and/or a standard frequency control. The optical output interface 160 also includes a standard, second optical wavelength division multiplexer 200 communicating with the optical signal processor 190. The second optical wavelength division multiplexer includes a standard, second, interleaver; a standard, second arrayed waveguide grating; a standard, second thin film filter, a standard, second Fabry-Perot filter, and/or a standard, second fiber Bragg grating. The optical output interface 160 also includes a standard phase-balanced photodetector 210 and a standard phase-balanced photodetector array 212 communicating with the second optical wavelength division multiplexer 200.

Figure 15:
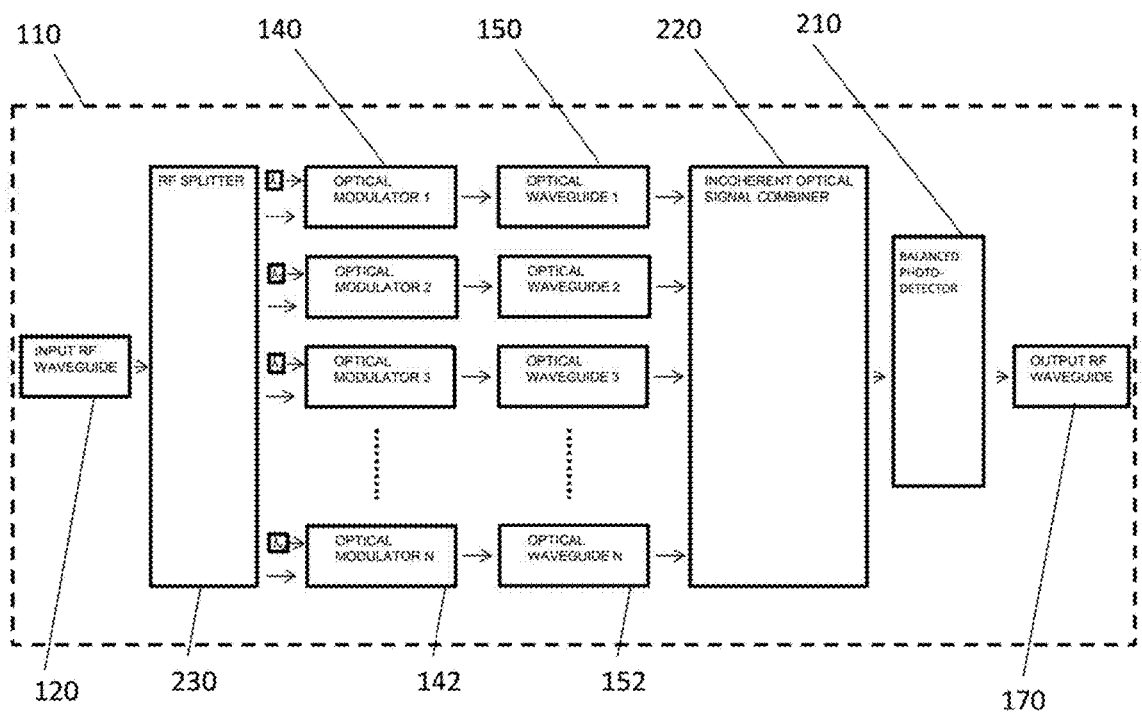
FIG. 15 is a block diagram of another embodiment of the invention including an impedance-matching interface, an incoherent optical signal combiner, and a balanced photodetector.
Figure 16:
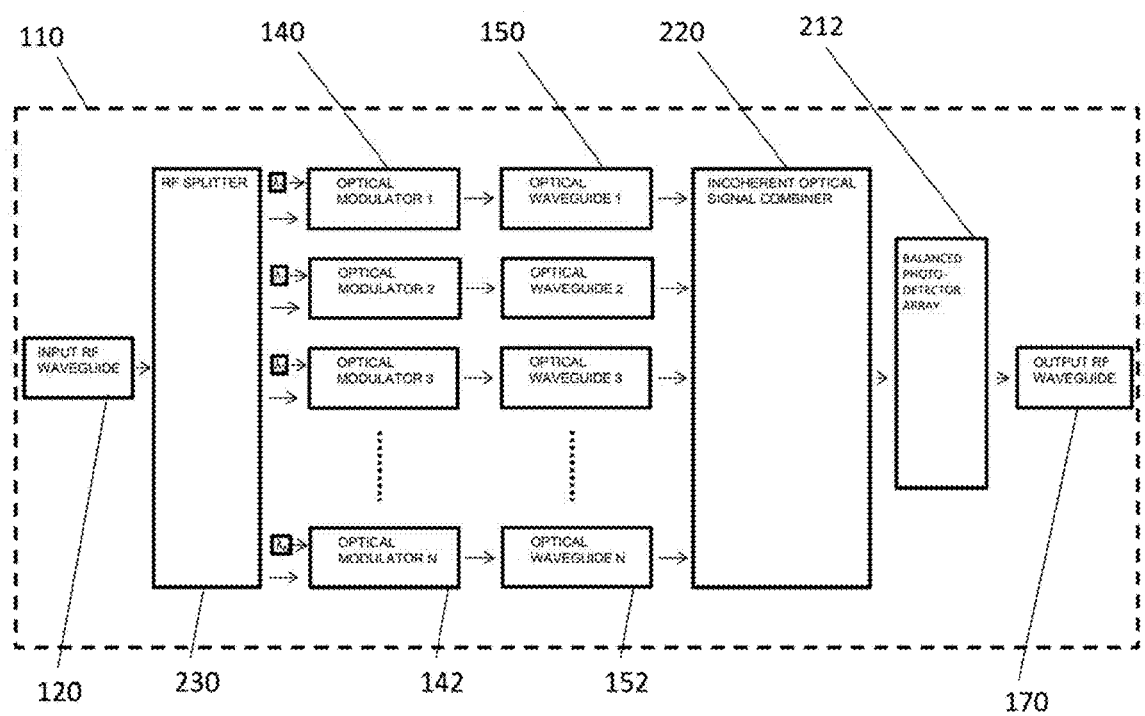
FIG. 16 is a block diagram of another embodiment of the invention including an impedance-matching interface, an incoherent optical signal combiner, and a balanced photodetector array.

Optionally, as shown by way of illustration in FIGS. 15 and 16, apparatus 110 includes a standard, input radio frequency waveguide 120, and a standard radio frequency splitter 230 communicating with the input radio frequency waveguide 120 and the plurality of optical modulators 140, 142.

Another embodiment of the invention includes an apparatus and is described as follows with reference to FIGS. 9-11 and 15-19. For example, as shown by way of illustration in FIGS. 10, 11, 18, and 19, the apparatus 110 includes a standard, optical output interface 160 including a standard, first optical wavelength division multiplexer 180. The optical output interface 160 includes an optical signal processor 190 communicating with the first optical wavelength division multiplexer 180. The optical output interface 160 includes a second optical wavelength division multiplexer 200 communicating with the optical signal processor 190. The first optical wavelength division multiplexer 180 includes a standard first interleaver; a standard, first arrayed waveguide grating; a standard, first thin film filter; a standard, first Fabry-Perot filter; and/or a standard first fiber Bragg grating. The optical signal processor 190 includes a standard time delay, a standard switch, a standard amplitude control, and/or a standard frequency control. The second optical wavelength division multiplexer 200 includes a standard, second interleaver, a standard, second arrayed waveguide grating, a standard, second thin film filter, a standard, second Fabry-Perot filter, and/or a standard, second fiber Bragg grating.

Figure 17:
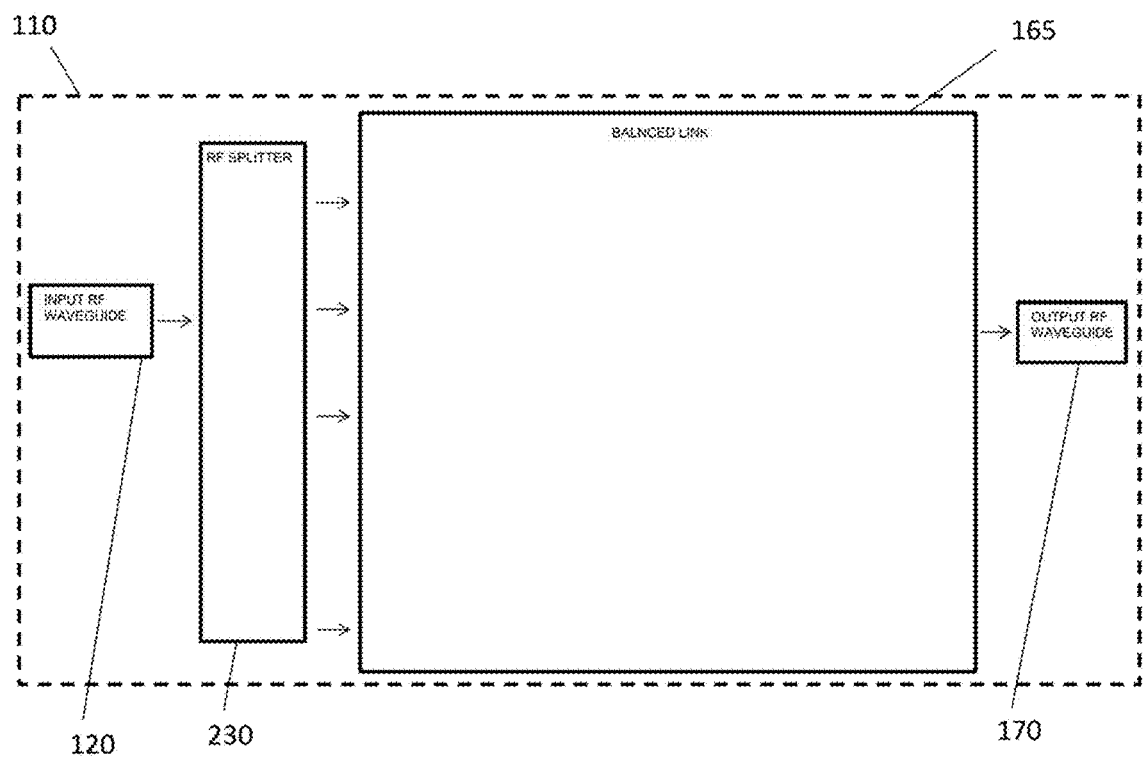
FIG. 17 is a block diagram of another embodiment of the invention including an RF splitter and a balanced link.

Optionally, as shown by way of illustration in FIG. 17, apparatus 110 includes a standard, input radio frequency waveguide 120 and a standard, radio-frequency-to-optical-radio-frequency-impedance-matching interface 230 communicating with the input radio frequency waveguide 120. The apparatus further includes a plurality of standard optical modulators 140, 142 communicating with the radio-frequency-to-optical-radio-frequency-impedance-matching interface 230. The apparatus also includes a plurality of standard, respective optical waveguides 150, 152 communicating with the plurality of optical modulators 140, 142. The plurality of respective optical waveguides 150, 152 in operation include a plurality of respective optical waveguide fields. The input radio frequency waveguide 120 in operation includes an input radio frequency waveguide field. The input radio frequency waveguide field interacts with the plurality of respective optical waveguide fields to convert an input radio frequency signal into a plurality of optical signals.

Optionally, as shown by way of illustration in FIGS. 15 and 16, the apparatus includes a standard, incoherent optical signal combiner 220 communicating with said plurality of respective optical waveguides 150, 152. The apparatus further includes a phase-balanced photodetector 210 or a phase-balanced photodetector array 212 communicating with the incoherent optical signal combiner 220. The apparatus also includes an output radio frequency waveguide communicating with the phase-balanced photodetector 210 or the phase-balanced photodetector array 212.

Figure 18:
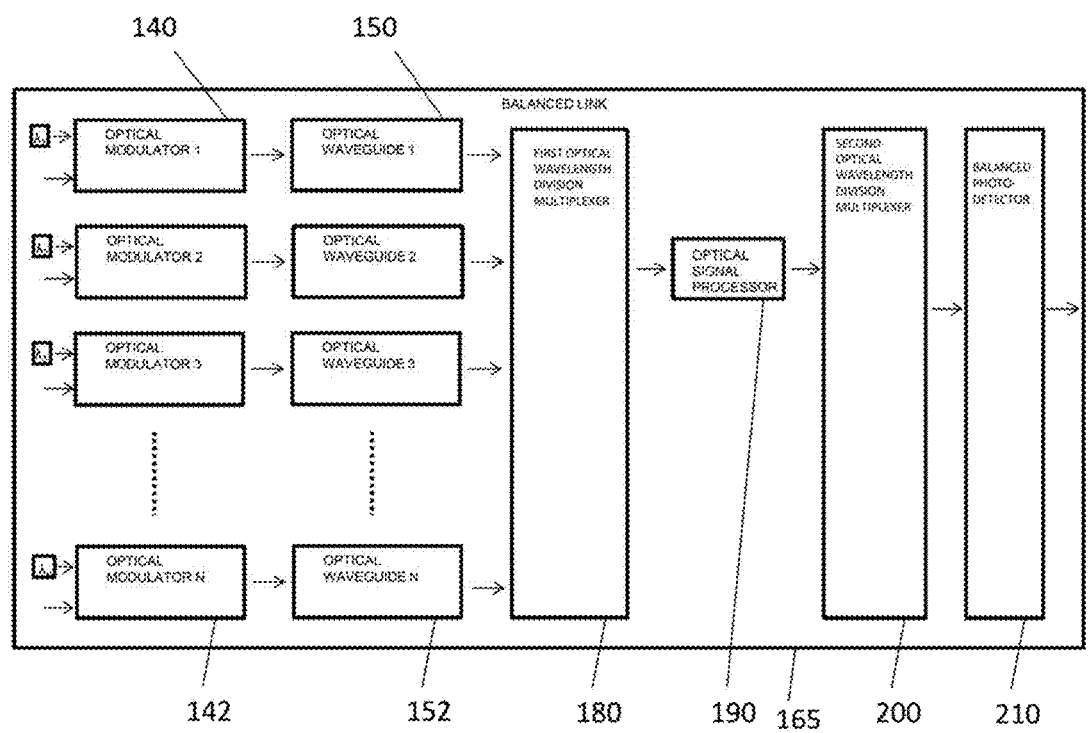
FIG. 18 is a block diagram of a balanced link according to an embodiment of the invention.
Figure 19:
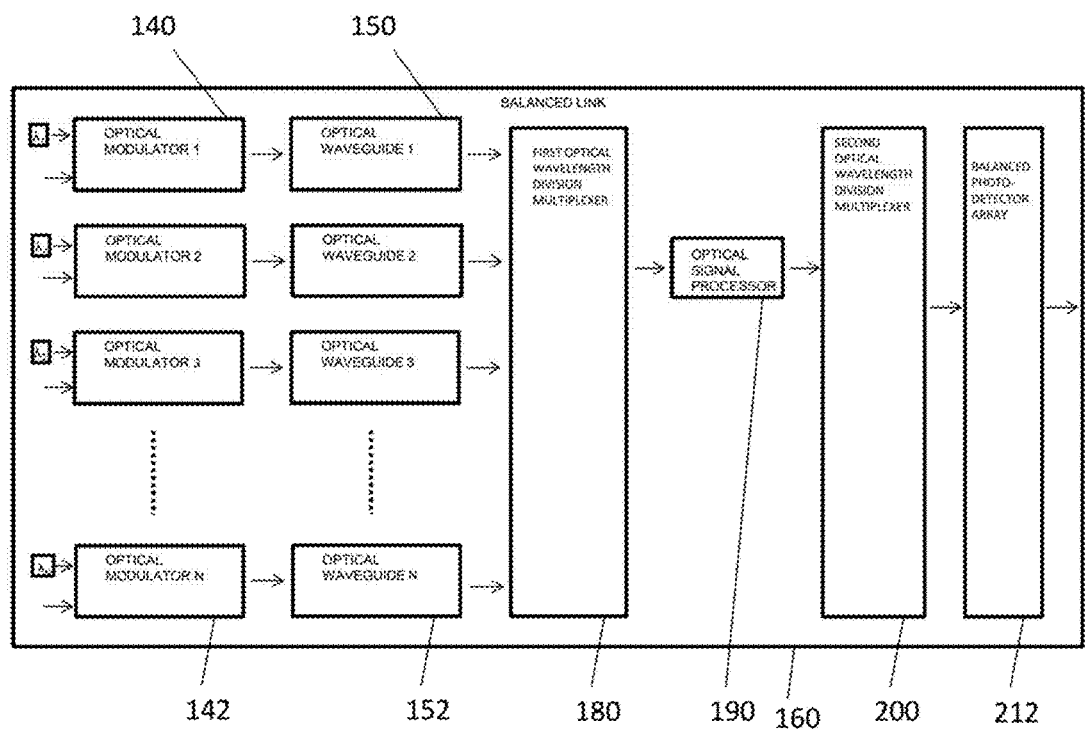
FIG. 19 is a block diagram of another balanced link according to an embodiment of the invention.

Optionally, as shown by way of illustration in FIGS. 17-19, a balanced link 165 comprises a plurality of standard, optical modulators 140, 142 communicating with the radio frequency splitter 230. The balanced link 165 includes a plurality of standard, respective optical waveguides 150, 152 communicating with the plurality of optical modulators and the first optical wavelength division, multiplexer 180. The plurality of respective optical waveguides 150, 152 in operation includes a plurality of respective optical waveguide fields. The input radio frequency waveguide 120 in operation includes an input radio frequency waveguide field. The input radio frequency waveguide field interacts with the plurality of respective optical waveguide fields to convert an input radio frequency signal into a plurality of optical signals. The apparatus 110 further includes a standard, input radio frequency waveguide 120, a standard, radio frequency splitter 230 communicating with the input radio frequency waveguide 120, and a standard, output radio frequency waveguide 170 communicating with the balanced link 165. The output radio frequency waveguide 170 in operation includes an output radio frequency waveguide field. The plurality of respective optical waveguide fields interacts with the output radio frequency waveguide field to convert the plurality of optical signals into an output radio frequency signal.

Still other embodiments of the invention include alternative apparatuses and are described as follows. For example, an embodiment of the invention, as shown by way of illustration in FIG. 12, includes a RF-to-Optical RF impedance-matching interface 130 designed to be at least as efficient as a standard RF splitter (such as shown in FIGS. 7 and 8) that takes a singular RF input and directs that signal to a plurality of optical modulators 140, 142, as if distributed by an RF splitter but without changing the impedance seen by the RF source (which leads to RF loss), each with a corresponding laser input. An illustrative form of RF-to-Optical impedance-matching interface 130 is discussed below. The output from each optical modulator 140, 142 is combined with a standard incoherent optical signal combiner 220 to combine the outputs from n single mode, optical waveguides 150, 152 into a single optical waveguide for ultimate connection to a standard, single photodetector or a standard photodetector array. In FIG. 12, this connection is made through a standard optical fiber. Alternatively, other embodiments of the invention include other standard optical waveguides. The incoherent optical combiner 220 sums the optical signals such that the optical power are summed in a photodetector 210, e.g., a photodiode, or a photodetector array 212, e.g., a photodiode array. This optical power summation in a photodiode improves the gain over a RF signal sum as would otherwise be obtained by photodetecting the signals individually and summing with an RF summer. Examples of incoherent optical signal combiner 220 include a standard wavelength division multiplexer, which can sum the outputs from distinct wavelengths (i.e., all modulator wavelengths being unique), a standard optical spatial mode summer, wherein multiple optical modes are combined with a multimode waveguide), or a standard, optical modal summer, wherein multiple spatial modes illuminate a single photodiode, or a parallel direct-wired connection of individual photodiodes.

For example, by utilizing an incoherent optical signal combiner 220 in the form of a standard, incoherent optical modal summer in an embodiment of the invention, the optical power is summed and illuminates the single photodiode. Each mode representing one element of the composite array, the detected photocurrent is summed and the gain of the composite array is improved by 20*log(n) compared to the single link and 10*log(n) compared to the RF summed array of individual photodiodes. This directly leads to an improvement in noise figure over the prior art, arrayed link shown in FIG. 8 as the noise summed in the photodiode from each link in the array is uncorrelated (i.e., not coherent), whereby the noise increase is only 10*log(n) such that the signal-to-noise ratio in the output improves as 10*log(n) for identical links.

Another embodiment of the invention, shown by way of illustration in FIGS. 15 and 16, is described as follows. In an embodiment of the invention, the apparatus shown in FIGS. 15 and 16 is the same functional form as the apparatus shown in FIGS. 12 and 13, respectively, the input RF-to-Optical interface replacing with an RF splitter.

Figure 20:
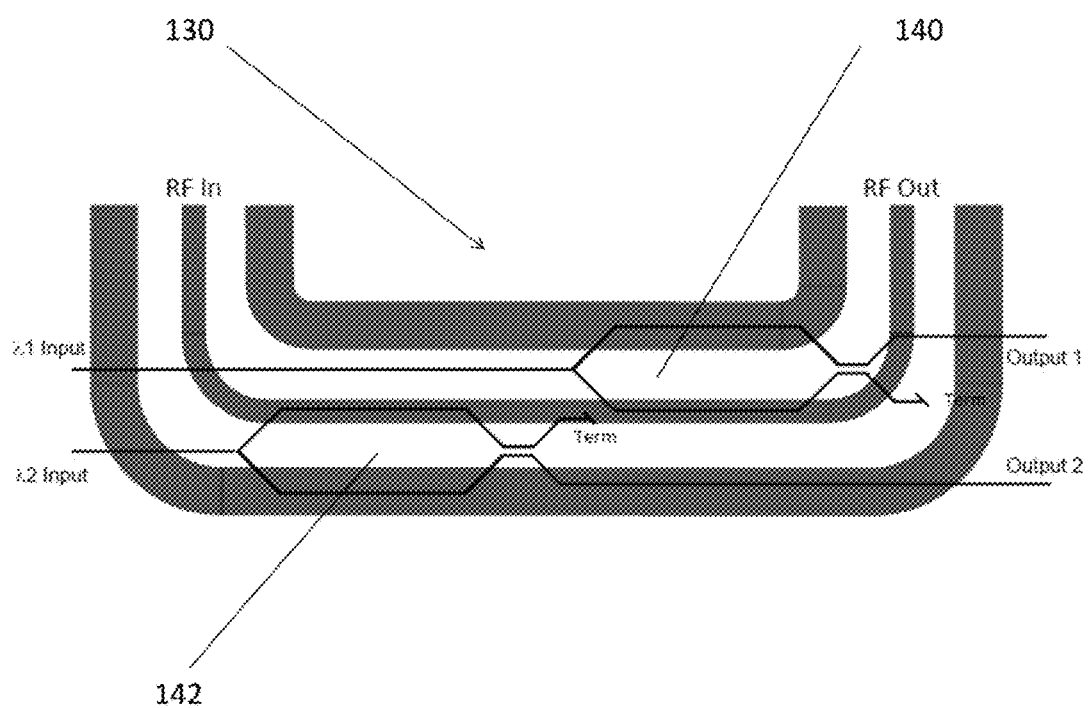
FIG. 20 is a cross-sectional view of an input RF-to-optical impedance-matching interface according to an embodiment of the invention.

Another embodiment of the invention, shown by way of illustration in FIG. 20, is described as follows. FIG. 20 shows a schematic of an embodiment of the RF-to-optical impedance interface 130 that outperform a standard RF splitter. FIG. 20 depicts a single input RF waveguide (drawn as a coplanar waveguide) that interacts with two optical Mach-Zehnder modulators ("MZMs") 140, 142. If the RF losses within this RF waveguide are kept low (e.g., less than 3 dB in terms of power) and the field overlap with the optical waveguides can be high (e.g., comparable to standard optical modulators), then a single RF waveguide can modulate two or more modulators without reducing the RF signal amplitude provided the RF and optical paths are delay-matched to give coherent nodulation. This is in contrast to the arrayed links architecture in FIG. 8, wherein the RF signal is first divided (thereby lowering the RF amplitude in each output by 10*log(n)) before being applied to the n-MZMs. This trade can be made in integrated MZMs as the optical losses of integrated modulators are usually higher than in bulk modulators such as those made from $LiNbO_3$. High optical losses limit improvements in modulator efficiency by limiting the benefits of increasing the modulator length to allow for more optical-electrical electric field interaction (which improves modulator Vπ) as there are diminishing returns, if no light exits the modulator. In $LiNbO_3$ where optical losses are low, modulator, interaction lengths are, for example, up to 20 centimeters or more, whereas, in integrated MZMs in InP, GaAs or Si, interaction lengths are, for example, limited to less than 10 millimeters, dominated by optical losses. The number of MZMs that can be efficiently modulated in an apparatus such as shown in FIG. 20 is limited by the attainable RF losses in the waveguide as this electrode is made longer. In the limit of zero RF insertion loss, another 10*log(n) reduction in the total link noise figure and increase in gain is expected for a link constructed from an array of n links, such as shown in FIG. 12, for a total gain increase and noise figure decrease of 20*log(n). This is a substantial result and should enable the current state of the art of 20-25 dB noise figures for integrated links to reduce to below 10 dB for links arrayed using this invention. This enables an entirely new class of applications for analog PICs.

Another embodiment of the invention, shown by way of illustration in FIGS. 17-20, is described as follows. In this embodiment, the array of modulators 140, 142 are biased on opposite slopes of the transfer function of the MZM. By using wavelength division multiplexing with alternating channels (or groups of channels) being biasing on opposite slopes of the transfer function of the MZM, standard complementary modulation is impressed on the signal sources. This allows all of the wavelengths to be multiplexed on a standard, single mono-mode optical fiber for transport, followed by an optical circuit that separates out the complementary modulation signals either with a standard optical interleaver (for wavelength division multiplexing with alternating channels) or with a standard course WDM (if oppositely biased channels are groups of wavelengths separated with sufficient wavelength spread to allow for coarse filtering), oppositely biased channel wavelengths can be separated at the output and delivered to a balanced photodetector pair or to balanced photodetector arrays. This enables techniques such as nonlinearity cancellation, for example, as discussed in U.S. Pat. No. 9,172,471, incorporated herein by reference) or common mode noise rejection (due to, for example, noise coupling through the current supply to the lasers). Advantageously, in an embodiment of the invention, only a single transmission fiber is needed, and many of the environmental effects due to differential fiber drift are eliminated, thus opening up the possibility to make practical very-high-frequency, modest-length high-linearity optical links. This embodiment of the invention also improves performance in links that tend to operate near the fiber nonlinearity threshold for Brillouin scattering (long distance, high-power links) as the power in this case is spread over many wavelengths.

Another embodiment of the invention, shown by way of illustration in FIGS. 15 and 16, is described as follows. Whereas at least one other embodiment of the invention includes a fiber link between transmitter and receiver, in this embodiment of the invention, the entire link resides on a standard microchip or systems that use optical links for processing without the need for long delays. With the layout in FIGS. 15 and 16, this expands the possibilities for the number of possible options for the output incoherent optical combiner 220. While WDM and modal summers can also be used on-chip, the multitude of optical signals can also be incoherently combined directly on the surface of a photodiode or directly to integrated photodiode arrays. Both of these embodiments allow for the potential to increase n over that possible using incoherent summation within a multimode fiber due to the substantially higher numerical aperture possible in photodiodes and the compactness of waveguides that can be achieved on-chip when large index contrast (example: air-semiconductor) is used. The complementary layout in FIG. 17 can also be used for links that reside entirely on-chip as in FIGS. 15 and 16.

Optionally, the plurality of optical modulators 150, 152, e.g., optical modulator arrays, includes standard photonic integrated circuits or standard Lithium Niobate modulators.

Optionally, the delay/remoting fiber (e.g., in the optical signal processor 190) is a standard single-mode optical fiber or a standard, multi-mode optical fiber, depending on the application requirements and specifications.

Optionally, the RF-to-optical impedance-matching interface 130 includes a parallel connection of lumped element modulators, which leads to bandwidth reductions due to parallel capacitance addition, but is, for example, an excellent solution for low frequency (<5 GHz) links.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed as new and desired to be protected by Letters Patent of the United States is:

1. An apparatus comprising:
    an input radio frequency waveguide;
    a radio-frequency-to-optical-radio-frequency-impedance-matching interface communicating with said input radio frequency waveguide;
    a plurality of optical modulators communicating with said radio-frequency-to-optical-radio-frequency-impedance-matching interface;
    a plurality of respective optical waveguides communicating with said plurality of optical modulators, said plurality of respective optical waveguides in operation comprising a plurality of respective optical waveguide fields;
    an optical output interface communicating with said plurality of respective optical waveguides; and
    an output radio frequency waveguide communicating with said optical output interface,
    wherein said input radio frequency waveguide in operation comprises an input radio frequency waveguide field, the input radio frequency waveguide field interacting with the plurality of respective optical waveguide fields to convert an input radio frequency signal into a plurality of optical signals
    wherein said optical output interface comprises:
        a first optical wavelength division multiplexer, first second optical wavelength division multiplexer comprising at least one of a first interleaver, a first arrayed waveguide grating, a first thin film filter, a first Fabry-Perot filter, and a first fiber Bragg grating:
        an optical signal processor communicating with said first optical wavelength division multiplexer, said optical signal processor comprising at least one of a time delay, a switch, an amplitude control, and a frequency control;
        a second optical wavelength division multiplexer communicating with said optical signal processor, said second optical wavelength division multiplexer comprising at least one of a second interleaver, a second arrayed waveguide grating, a second thin film filter, a second Fabry-Perot filter, and a second fiber Bragg grating; and
        one of a phase-balanced photodetector and a phase-balanced photodetector array communicating with said second optical wavelength division multiplexer and said output radio frequency waveguide, said one of a phase-balanced photodetector and a phase-balanced photodetector array outputting an output radio frequency signal to said output radio frequency waveguide.

2. The apparatus according to claim 1, wherein each optical modulator of said plurality of optical modulators comprises one of an optical intensity modulator, an optical phase modulator, an optical polarization modulator, and an optical frequency modulator.

3. The apparatus according to claim 1, further comprising:
    an incoherent optical signal combiner communicating with said plurality of respective optical waveguides;
    one of a phase-balanced photodetector and a phase-balanced photodetector array communicating with said incoherent optical signal combiner; and
    an output radio frequency waveguide communicating with said one of a phase-balanced photodetector and a phase-balanced photodetector array.

4. The apparatus according to claim 3, wherein said incoherent optical signal combiner comprises one of a wavelength division multiplexer, a spatial division multiplexer, and an optical modal summer.

5. The apparatus according to claim 3, further comprising:
    one of a single microchip and a plurality of microchips comprising at least one of said impedance-matching interface and said incoherent optical signal combiner.

6. An apparatus comprising:
a plurality of optical modulators;
a plurality of respective optical waveguides communicating with said plurality of optical modulators, said plurality of respective optical waveguides in operation comprising a plurality of respective optical waveguide fields;
an incoherent optical signal combiner communicating with said plurality of respective optical waveguides;
one of a phase-balanced photodetector and a phase-balanced photodetector array communicating with said incoherent optical signal combiner;
an output radio frequency waveguide communicating with said one of a phase-balanced photodetector and a phase-balanced photodetector array and outputting an output radio frequency signal;
an input radio frequency waveguide;
a radio-frequency-to-optical-radio-frequency-impedance-matching interface communicating with said input radio frequency waveguide and said plurality of optical modulators;
an optical output interface communicating with said plurality of optical waveguides and said output radio frequency waveguide.
wherein said input radio frequency waveguide in operation comprises an input radio frequency waveguide field, the input radio frequency waveguide field interacting with the plurality of respective optical output waveguide fields to convert an input radio frequency signal into the plurality of optical signals,
wherein said optical output interface comprises:
a first optical wavelength division multiplexer, said first optical wavelength division multiplexer comprising at least one of a first interleaver, a first arrayed waveguide grating, a first thin film filter, a first Fabry-Perot filter, and a first fiber Bragg grating;
an optical signal processor communicating with said first optical wavelength division multiplexer, said optical signal processor comprising at least one of a time delay, a switch, an amplitude control and a frequency control; and
a second optical wavelength division multiplexer communicating with said optical signal processor, said second optical wavelength division multiplexer comprising at least one of a second interleaver, a second arrayed waveguide grating, a second thin film filter, a second Fabry-Perot filter, and a second fiber Bragg grating; and
said one of a phase-balanced photodetector and a phase-balanced photodetector array communicating with said second optical wavelength division multiplexer,
wherein said output radio frequency waveguide in operation comprises an output radio frequency waveguide field, the plurality of respective optical waveguide fields interacting with the output radio frequency waveguide field to convert a plurality of optical signals into the output radio frequency signal.

7. The apparatus according to claim 6, wherein said incoherent optical signal combiner comprises one of a wavelength division multiplexer, a spatial division multiplexer, and an optical modal summer.

8. The apparatus according to claim 6, further comprising:
one of a single microchip and a plurality of microchips comprising at least one of said impedance-matching interface and said incoherent optical signal combiner.

9. The apparatus according to claim 6, wherein each optical modulator of said plurality of optical modulators comprises one of an optical intensity modulator, an optical phase modulator, an optical polarization modulator, and an optical frequency modulator.

10. The apparatus according to claims claim 6, further comprising:
an input radio frequency waveguide; and
a radio frequency splitter communicating with said input radio frequency waveguide and said plurality of optical modulators.

11. An apparatus comprising:
an optical output interface comprising a first optical wavelength division multiplexer; an optical signal processor communicating with said first optical wavelength division multiplexer; and a second optical wavelength division multiplexer communicating with said optical signal processor;
an input radio frequency waveguide;
a radio-frequency-to-optical-radio-frequency-impedance-matching interface communicating with said input radio frequency waveguide;
a plurality of optical modulators communicating with said radio-frequency-to-optical-radio-frequency-impedance-matching interface; and
a plurality of respective optical waveguides communicating with said plurality of optical modulators, said plurality of respective optical waveguides in operation comprising a plurality of respective optical waveguide fields,
wherein said input radio frequency waveguide in operation comprises an input radio frequency waveguide field, the input radio frequency waveguide field interacting with the plurality of respective optical waveguide fields to convert an input radio frequency signal into a plurality of optical signals,
wherein said first second optical wavelength division multiplexer comprises at least one of a first interleaves, a first arrayed waveguide grating, a first thin film filter, a first Fabry-Perot filter, and a first fiber Bragg grating,
wherein said optical signal processor comprises at least one of a time delay, a switch, an amplitude control, and a frequency control,
wherein said second optical wavelength division multiplexer comprises at least one of a second interleaver, a second arrayed waveguide grating, a second thin film filter, a second Fabry-Perot filter, and a second fiber Bragg grating.

12. The apparatus according to claim 11, further comprising:
an incoherent optical signal combiner communicating with said plurality of respective optical waveguides;
one of a phase-balanced photodetector and a phase-balanced photodetector array communicating with said incoherent optical signal combiner; and
an output radio frequency waveguide communicating with said one of a phase-balanced photodetector and a phase-balanced photodetector array.

13. The apparatus according to claim 11, wherein said optical output interface comprises a plurality of optical modulators communicating with said radio frequency splitter, wherein said optical output interface comprises a plurality of respective optical waveguides communicating with said plurality of optical modulators and said first optical wavelength division multiplexer, said plurality of respective optical waveguides in operation comprising a plurality of respective optical waveguide fields, wherein said input radio frequency waveguide in operation comprises an input radio frequency waveguide field, the input radio frequency waveguide field interacting with the plurality of respective optical waveguide fields to convert an input radio frequency signal into a plurality of optical signals, the apparatus further comprising:
- an input radio frequency waveguide;
- a radio frequency splitter communicating with said input radio frequency waveguide; and
- an output radio frequency waveguide communicating with said optical output interface, wherein said output radio frequency waveguide in operation comprises an output radio frequency waveguide field, the plurality of respective optical waveguide fields interacting with the output radio frequency waveguide field to convert the plurality of optical signals into an output radio frequency signal.

* * * * *